(12) United States Patent
Nadolny Madsen

(10) Patent No.: US 12,038,398 B2
(45) Date of Patent: Jul. 16, 2024

(54) DETECTION UNIT

(71) Applicant: Proxima Centauri ApS, Odense SV (DK)

(72) Inventor: Peter Nadolny Madsen, Svendborg (DK)

(73) Assignee: Proxima Centauri ApS, Odense SV (DK)

( * ) Notice: Subject to any disclaimer, the term of this patent is extended or adjusted under 35 U.S.C. 154(b) by 16 days.

(21) Appl. No.: 18/121,771

(22) Filed: Mar. 15, 2023

(65) Prior Publication Data
US 2023/0232845 A1 Jul. 27, 2023

Related U.S. Application Data

(63) Continuation of application No. PCT/DK2021/050294, filed on Sep. 22, 2021.

(30) Foreign Application Priority Data

Sep. 24, 2020 (DK) .......................... PA 2020 01101
Apr. 28, 2021 (DK) .......................... PA 2021 00426

(51) Int. Cl.
| | | |
|---|---|---|
| *G01N 27/00* | (2006.01) | |
| *A22C 13/00* | (2006.01) | |
| *A22C 17/14* | (2006.01) | |
| *G01M 3/16* | (2006.01) | |
| *G01N 27/04* | (2006.01) | |

(52) U.S. Cl.
CPC ....... *G01N 27/041* (2013.01); *A22C 13/0003* (2013.01); *A22C 17/14* (2013.01); *G01M 3/16* (2013.01)

(58) Field of Classification Search
CPC .. G01N 27/041; A22C 27/041; A22C 13/003; A22C 17/14; A22C 11/00; G01M 3/16
USPC .......................................................... 452/106
See application file for complete search history.

(56) References Cited

U.S. PATENT DOCUMENTS

| | | |
|---|---|---|
| 3,938,220 A | 2/1976 | Sheridan et al. |
| 5,217,404 A | 6/1993 | Lanfrey |
| 7,306,511 B2 * | 12/2007 | Whittlesey .............. A23P 20/25 452/45 |
| 2003/0110833 A1 | 6/2003 | Jolic |

(Continued)

FOREIGN PATENT DOCUMENTS

| | | |
|---|---|---|
| CN | 209489408 U | 10/2019 |
| CN | 110613011 A | 12/2019 |

(Continued)

*Primary Examiner* — Richard T Price, Jr.
(74) *Attorney, Agent, or Firm* — Elevated IP, LLC

(57) ABSTRACT

A detection unit configured to detect a leakage hole in an intestine suspended on a tubular member having a perforated portion that is configured to distribute a flow of liquid through the perforated portion and thereby pressurize the intestine, when the intestine is being moved with a non-zero velocity (V) along the longitudinal axis of the tubular member is disclosed. The detection unit comprises an electrically conducting and axially extending sleeve-shaped surrounding portion that at least partly surrounds the circumference of the tubular member and an electric circuitry arranged and configured to measure an electric quantity established between the surrounding portion and the liquid pressurizing the intestine.

20 Claims, 10 Drawing Sheets

(56) References Cited

U.S. PATENT DOCUMENTS

| | | |
|---|---|---|
| 2008/0023661 A1 | 1/2008 | Gu et al. |
| 2009/0126801 A1 | 5/2009 | Grill et al. |
| 2010/0011840 A1 | 1/2010 | Carson |
| 2010/0224804 A1 | 9/2010 | Sneh |
| 2012/0142261 A1* | 6/2012 | Hanten .............. A22C 11/0245 452/37 |
| 2013/0180599 A1 | 7/2013 | Hurst |
| 2016/0091101 A1 | 3/2016 | Neubauer et al. |

FOREIGN PATENT DOCUMENTS

| | | |
|---|---|---|
| CN | 209965113 U | 1/2020 |
| CN | 210664355 U | 6/2020 |
| CN | 210869670 U | 6/2020 |
| CN | 111521355 A | 8/2020 |
| EP | 0247530 A2 | 12/1987 |
| EP | 1623628 A2 | 2/2006 |
| GB | 1261760 A | 1/1972 |
| GB | 2428182 A | 1/2007 |
| JP | H0974988 A | 3/1997 |
| JP | 2004000152 A | 1/2004 |
| WO | 2020002208 A1 | 1/2020 |
| WO | 2020064074 A1 | 4/2020 |
| WO | 2020125892 A1 | 6/2020 |

\* cited by examiner

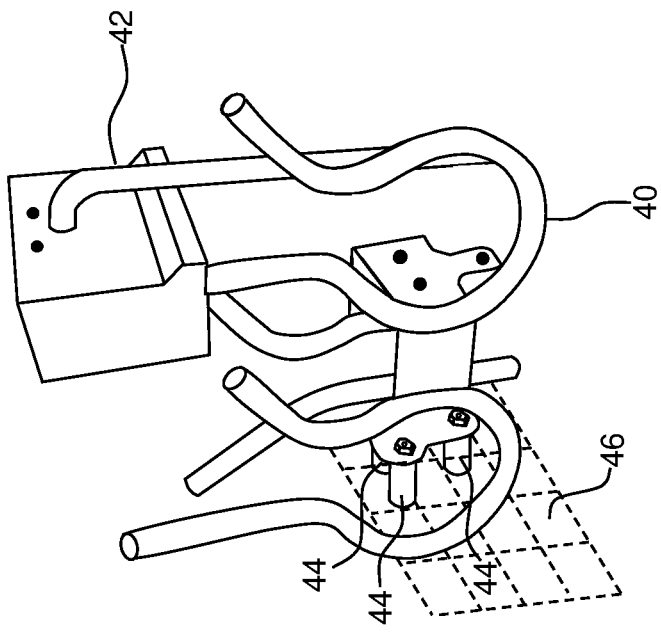
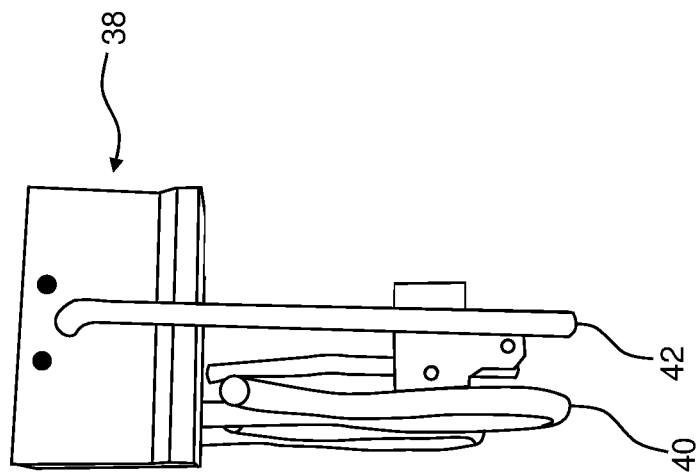

DETECTION UNIT

CROSS-REFERENCE TO RELATED APPLICATIONS

This application is a continuation under 35 U.S.C. 111 of International Patent Application No. PCT/DK2021/050294, filed Sep. 22, 2021, which claims the benefit of and priority to Danish Application Nos. PA 2021 00426, filed Apr. 28, 2021, and PA 2020 01101, filed Sep. 24, 2020, each of which is hereby incorporated by reference in its entirety.

FIELD OF INVENTION

The present invention relates to detection units and methods for detecting a leakage hole in an intestine that is processed while being suspended on an electrically conducting tubular member.

BACKGROUND

To determine the quality and to cut the carcass into valuable parts of meat, the examination and processing devices are controlled relative to the location of anatomical parts of the carcass. Intestines from the animals are processed in a similar way, and e.g. natural casings are of major interest.

Processing of intestines from the animals involves several steps including cleaning the intestines, scraping of the inner wall of the intestines to remove the mucous layer and scraping of the outer part of the intestines. An additional step of measurement is carried out in order to pack the intestines according to their size and quality. In the step of measurement, the diameter of each intestine is detected so that the diameter can be used to classify the intestine and to cut the intestine into pieces based on the diameter along the length of the intestine.

Detection of holes in an intestine is essential when establishing the quality of the intestine. Therefore, several methods for identifying holes in an intestine that is suspended on a tubular member have been developed. Some of the prior art methods are based on optical detection of the hole. An optical detection can be accomplished by using optical sensors such as a camera. The use of cameras is, however, associated with several disadvantages.

First of all, several cameras are required in order to cover all sides of the intestine. Moreover, since insufficient lighting may make it impossible to apply the cameras, a complex and expensive lighting is typically required. Furthermore, water from the intestine may splash on the cameras so that the water has to be wiped off in order to maintain a high camera data quality.

Therefore, it would be an advantage to be able to provide an alternative way of identifying holes in an intestine that is suspended on a tubular member.

BRIEF DESCRIPTION

It is an object of the present methods to provide an alternative for identifying holes in an intestine that is suspended on a tubular member.

It is also an object of the present invention to provide a detection unit for identifying holes in an intestine that is suspended on a tubular member.

A detection unit according to the disclosure is a detection unit configured to detect a leakage hole in an intestine suspended on a tubular member having a perforated portion that is configured to distribute a flow of liquid through the perforated portion and hereby pressurize the intestine, when the intestine is being moved with a non-zero velocity along the longitudinal axis of the tubular member, wherein the detection unit comprises:

an electrically conducting and axially extending sleeve-shaped surrounding portion that at least partly surrounds the circumference of the tubular member; and an electric circuitry arranged and configured to measure an electric quantity which is established between the surrounding portion and the liquid pressurizing the intestine.

Hereby it is possible to provide a detection unit that makes it possible to identify holes in an intestine that is suspended on a tubular member in a reliable and easy manner.

In an embodiment, the tubular member is an electrically conducting tubular member. In an embodiment, the tubular member is a rod-shaped member made of a metal.

If the tubular member is not electrically conducting, electric circuitry may be configured to measure an electrical quantity between the surrounding portion and a contact structure (e.g. an anode) being electrically connected to the liquid.

By providing an electrically conducting and axially extending sleeve-shaped surrounding portion that at least partly surrounds the circumference of the tubular member it is possible to measure an electric quantity which is established between the surrounding portion and the liquid pressurizing the intestine.

The electric circuitry is arranged and configured to measure an electric quantity which is established between the surrounding portion and the liquid pressurizing the intestine.

In an embodiment, the electric circuitry is arranged and configured to measure an electric quantity which is established between the surrounding portion and the tubular member.

In an embodiment, the electric quantity is the electric resistance.

In an embodiment, the electric quantity is the electric current.

In an embodiment, the electric quantity is the electric voltage.

Since the intestine is pressurized, there will be a jet of water when a portion of the pressurized intestine comprises a hole. When a portion of an intestine that comprises a hole passes the surrounding portion, the jet of water will extend between and thus connect the water inside the intestine and the surrounding portion. Accordingly, the electrical resistance is decreased compared to the situation, in which the water inside the intestine and the surrounding portion is separated solely by the intestine and the surrounding air. Accordingly, by measuring the current or the resistance between the surrounding portion and the tubular member, it is possible to detect if the intestine comprises a hole that passes the surrounding portion.

The velocity is typically in the range 0.5-3 m/s.

In an embodiment, the velocity is in the range 1-2.5 m/s.

In an embodiment, the perforated portion is formed as a plurality of holes (through bores) in the radial surface of the tubular member.

In an embodiment, the perforated portion is formed as one or more slots provided in the radial surface of the tubular member.

In an embodiment, at least a portion of the tubular member is formed as a pipe.

In an embodiment, the distance D between the surrounding portion and the tubular member is selected in dependency of the type of intestine.

In an embodiment, the distance is within the range 20-50 mm if the intestine is from a pig. The term pig includes hogs and swine.

In an embodiment, the distance is within the range 10-40 mm if the intestine is from a sheep.

In an embodiment, the distance is within the range 25-70 mm if the intestine is from cattle. The term "cattle" includes "livestock".

The tubular member is narrow enough to be able to receive the smallest intestine having a diameter $D_{min}$. The surrounding portion may be shaped as a sensor ring.

The surrounding portion is large enough to ensure that there is always air between the intestine and the surrounding portion, even at the largest intestinal diameter $D_{max}$ the processing unit is intended for. Accordingly, the ring must always be at least $(D_{max}-D_{min})$ larger than the diameter of the tubular member.

Accordingly, the distance D between the surrounding portion and the tubular member distance must fulfill the following equation (A):

$$D \geq D_{max} - D_{min} \quad (A)$$

The detection unit will also work if the distance D is greater. It is just more likely that the water jet will break before it reaches the surrounding portion.

It may be an advantage that the surrounding portion comprises a first part and a second part, wherein the first part and a second part are movably arranged relative to each other.

In an embodiment, the surrounding portion comprises two identical parts.

In an embodiment, the two parts are semi-cylindrical.

In an embodiment, the surrounding portion comprises two parts that are electrically connected to each other.

In an embodiment, the surrounding portion is a one-piece body.

In an embodiment, the one-piece body is cylindrical.

In an embodiment, the surrounding portion extends along at least 180 degrees of the circumference of the tubular member.

It may be advantageous that the electric circuitry is electrically connected to a first contact point being electrically connected to the liquid (when the tubular member has filled liquid into the intestine) and to the surrounding portion in a second contact point that is electrically isolated from the liquid.

It may be an advantage that the surrounding portion is made of metal.

In an embodiment, the surrounding portion is made of stainless steel.

It may be beneficial that the surrounding portion extends along at least 355 degrees of the circumference of the tubular member.

In an embodiment, the surrounding portion extends along 360 degrees of the circumference of the tubular member.

In an embodiment, the electric circuitry is configured to detect when the electrical quantity between the surrounding portion and the liquid pressurizing the intestine is not within a predefined interval (below a predefined level if the electrical resistance is measured or above a predefined level if the current is measured) for a time period being longer than a predefined non-zero time. Hereby, it is possible to avoid a false alarm.

In an embodiment, the electric circuitry is configured to detect when the electrical quantity between the surrounding portion and the tubular member is not within a predefined interval (below a predefined level if the electrical resistance is measured or above a predefined level if the current is measured) for a time period longer than a predefined non-zero time. Hereby, it is possible to avoid a false alarm.

In an embodiment, the electric circuitry is configured to detect when the electrical current between the surrounding portion and the liquid pressurizing the intestine is below a predefined level (this is relevant if the electrical resistance is measured) for a time period longer than a predefined non-zero time.

In an embodiment, the electric circuitry is configured to detect when the electrical current between the surrounding portion and the tubular member is below a predefined level (this is relevant if the electrical resistance is measured) for a time period longer than a predefined non-zero time.

In an embodiment, the electric circuitry is configured to detect when the electrical current between the surrounding portion and the tubular member is above a predefined level (this is relevant if the current is measured) for a time period longer than a predefined non-zero time.

In an embodiment, the electric circuitry is configured to detect when the electrical current between the surrounding portion and the liquid pressurizing the intestine is above a predefined level (this is relevant if the current is measured) for a time period longer than a predefined non-zero time.

In an embodiment, the predefined resistance level is 10 MΩ or less. Testing has revealed that this resistance level is suitable in order to avoid a false alarm.

It may be an advantage that the predefined time T' is selected in dependency of the length L of the surrounding portion and the velocity V such that:

$$\frac{L}{V} \geq T' \geq \frac{L}{10V}.$$

In an embodiment, the predefined time T' is selected in dependency of the length L of the surrounding portion and the velocity V such that:

$$\frac{L}{V} \geq T' \geq \frac{L}{5V}.$$

In an embodiment, the predefined time T' is selected in dependency of the length L of the surrounding portion and the velocity V such that:

$$\frac{L}{V} \geq T' \geq \frac{L}{2V}.$$

In an embodiment, the predefined time T' is at least 3 ms.
In an embodiment, the predefined time T' is at least 5 ms.
In an embodiment, the predefined time T' is at least 8 ms.
In an embodiment, the predefined time T' is at least 10 ms.
In an embodiment, the predefined time T' is at least 25 ms.
In an embodiment, the predefined time T' is at least 50 ms.
In an embodiment, the processing unit comprises a chassis.

To prevent a liquid film from creating a false electrical connection from the surrounding portion to the machine chassis, it may be advantageous to place an electrically conductive structure (e.g. a plate) between the chassis of the processing unit and the surrounding portion. This electrically conductive structure will be electrically isolated from both the chassis and the surrounding portion, and an electrical circuit ensures that the voltage on this electrically conductive structure is at all times the same as the voltage on the surrounding portion.

Since any liquid film that may lie between the surrounding portion and the chassis must pass over the electrically conductive structure, it is not possible for any current to flow from the surrounding portion to the chassis because there is no voltage potential between the surrounding portion and the electrically conductive structure.

If an electrical current flows between the electrically conductive structure the chassis, this current will not affect the measurement of electrical quantities between the surrounding portion and the fluid inside the intestine.

A method according to the disclosure is a method for detecting a leakage hole in an intestine that is suspended on a tubular member having a perforated portion that is configured to distribute a flow of liquid through the perforated portion and hereby pressurize the intestine, when the intestine is being moved with a non-zero velocity along the longitudinal axis of the tubular member, wherein the method comprises the following steps:
arranging an electrically conducting and axially extending sleeve-shaped surrounding portion such that the surrounding portion at least partly surrounds the circumference of the tubular member; and
measuring an electrical quantity between the surrounding portion and the liquid pressurizing the intestine.

Hereby, it is possible, to identify holes in an intestine that is suspended on a tubular member in a reliable and easy manner.

In an embodiment, the tubular member is an electrically conducting tubular member.

If the tubular member is not electrically conducting, the electrical quantity between the surrounding portion and the liquid pressurizing the intestine can be measured between the surrounding portion and a contact structure (e.g. an anode) being electrically connected to the liquid.

It may be advantageous that the method comprises the step of arranging the tubular member such that the distance between the surrounding portion and the tubular member is selected independently of the type of intestine, wherein the distance is:
a) within the range 20-50 mm if the intestine is from a pig;
b) within the range 10-40 mm if the intestine is from a sheep; and
c) within the range 25-70 mm if the intestine is from cattle.

Hereby, the optimum setup can be achieved.

It may be an advantage that the surrounding portion comprises a first part and a second part, wherein the first part and the second part are movably arranged relative to each other. Hereby, insertion of the intestine through the surrounding portion can be eased.

It may be an advantage that the method comprises the step of applying a surrounding portion that is formed as a one-piece body.

In an embodiment, the method comprises the step of applying a surrounding portion that extends along at least 180 degrees of the circumference of the tubular member.

In an embodiment, the method comprises the step of applying a surrounding portion that extends along at least 355 degrees of the circumference of the tubular member.

In an embodiment, the method comprises the step of applying a surrounding portion that extends at least along 358 degrees of the circumference of the tubular member.

In an embodiment, the surrounding portion extends along 360 degrees of the circumference of the tubular member.

It may be an advantage that the method comprises the step of applying an electric circuitry that is configured to detect when the electrical quantity between the surrounding portion and the liquid (when the tubular member has filled liquid into the intestine) is below a predefined level (this is relevant if the electrical resistance is measured) or above a predefined level (this is relevant if the current is measured) for a time period longer than a predefined non-zero time T'. Hereby, a false alarm can be avoided in case there is an electrical connection through water between the surrounding portion and the tubular member for a short time period where there is no hole in the intestine.

It may be advantageous that the method comprises the step of applying an electrical resistance as the electrical quantity, wherein the predefined resistance level is 10 MΩ or less.

It may be an advantage that the method comprises the step of applying a predefined time T' that is selected in dependency of the length L of the surrounding portion and the velocity V such that $$\frac{L}{V} \geq T' \geq \frac{L}{10V}.$$

It may be an advantage that the method comprises the step of applying a predefined time T' that is selected in dependency of the length L of the surrounding portion and the velocity V such that $$\frac{L}{V} \geq T' \geq \frac{L}{5V}.$$

It may be an advantage that the method comprises the step of applying a predefined time T' that is selected in dependency of the length L of the surrounding portion and the velocity V such that $$\frac{L}{V} \geq T' \geq \frac{L}{2V}.$$

It may be beneficial to have a processing unit for processing an intestine having an open end, wherein the processing unit comprises:
a tubular member having a perforated portion that is configured to distribute a flow of liquid through the perforated portion, wherein the tubular member is configured to receive the open end of the intestine and suspend the intestine on the tubular member and hereby pressurize the intestine;
two drive rollers comprising circumferential tracks configured to engage with the tubular member, where at least one of the drive rollers is arranged and configured to move the intestine with a non-zero velocity along the longitudinal axis of the tubular member;
two clamping rollers arranged to be brought into a clamping configuration, in which the intestine is clamped by the clamping rollers, wherein the distal end of the tubular member is arranged between the drive rollers and the clamping rollers, wherein the processing unit comprises a detection unit according to the present disclosure.

Hereby, it is possible to provide a processing unit that is capable of processing an intestine and at the same time detecting holes in the intestine in a fast and reliable manner.

In an embodiment, the tubular member is electrically conducting.

It may be an advantage that the detection unit is arranged between the drive rollers and the clamping rollers.

The intestine detector according to the present disclosure comprises a first end detector and a second end detector arranged a non-zero distance from the first end detector, wherein the intestine detector comprises an intermediate detector arranged and distanced between each of the end detectors in such a configuration that the intermediate detector will be electrically connected to any intestine suspended on the end detectors and extending between the first end detector and the second end detector.

Hereby, it is possible to measure an electrical quantity between the end detectors and the intermediate detector in order to detect if an intestine is suspended on the intestine detector.

In an embodiment, the intestine detector comprises an electrical circuitry configured to detect the electrical resistance between any of the end detector and the intermediate detector.

In an embodiment, the intestine detector comprises an electrical circuitry configured to detect the electrical current between any of the end detector and the intermediate detector.

In an embodiment, the intestine detector comprises an electrical circuitry configured to detect the electrical potential difference between any of the end detector and the intermediate detector.

In an embodiment, each of the end detectors is shaped to receive and maintain an intestine suspended on the end detector.

In an embodiment, the end detectors have the same geometric form.

In an embodiment, the end detectors comprise a hook-shaped portion. Hereby, the end detectors can receive and maintain an intestine suspended thereon.

In an embodiment, the intermediate detector has a straight distal portion extending between the first end detector and the second end detector.

In an embodiment, the end detectors and the intermediate detector are made of metal.

In an embodiment, the end detectors and the intermediate detector are made of stainless steel.

In an embodiment, the end detectors extend through a mounting box that comprises electrical connection structures for connecting an electric circuitry configured to perform one of more electrical measurements using the detectors.

In an embodiment, the intestine detector comprises two equally shaped receiving portions each comprising a set of detectors and an intermediate detector arranged therebetween.

In an embodiment, the intestine detector is electrically insulated by insulators from the wall onto which the intestine detector is attached.

In an embodiment, the intestine detector comprises an electrical circuitry that is equal to the electrical circuitry that the detection unit according to the present disclosure comprises.

In an embodiment, the intestine detector and the detection unit according to the present disclosure use the same electrical circuitry.

BRIEF DESCRIPTION OF THE DRAWINGS

The disclosed systems and methods will become more fully understood from the detailed description given herein below. The accompanying drawings are given by way of illustration only, and thus, they are not limitative of the present systems and methods. In the accompanying drawings:

FIG. 11 shows an intestine detector according to an embodiment; and

FIG. 12 shows a perspective side view of the intestine detector shown in FIG. 11.

DETAILED DESCRIPTION

Figure 1:
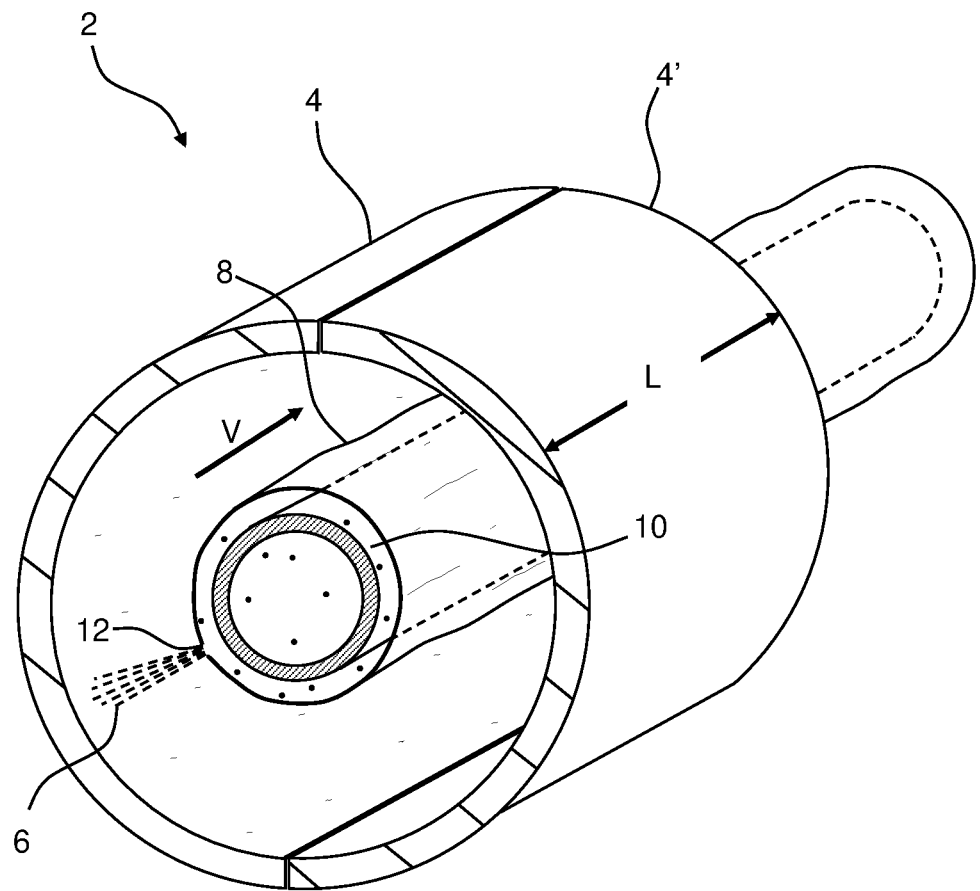
FIG. 1 shows a schematic, perspective, cross-sectional view of a detection unit according to an embodiment.

Referring now in detail to the drawings for the purpose of illustrating embodiments of the present systems and methods, a cross-sectional view of a detection unit 2 according to an embodiment is illustrated in FIG. 1.

The detection unit 2 comprises an electrically conducting and axially extending sleeve-shaped surrounding portion having a first part 4 and a second part 4'. Each part 4, 4' is semi-circular and extends along 180 degrees of the circumference of an electrically conducting tubular member 10. The tubular member 10 is formed as a pipe that is centrally arranged in the surrounding portion and extends axially along the longitudinal axis of the surrounding portion.

An intestine 8 is suspended on the tubular member 10. The tubular member 10 has a perforated portion that is configured to distribute a flow of liquid 6 through the perforated portion and hereby pressurize the intestine 8. The intestine 8 is being moved with a non-zero velocity V along the longitudinal axis of the tubular member 10.

The detection unit 2 is configured to detect if there is a leakage hole 12 in the intestine 8. Since the intestine 8 is pressurized, there is a jet of water 6. The jet of water 6 extends between the water inside the intestine 8 and the first part 4 of the surrounding portion.

The jet of water 6 establishes an electrical connection between the tubular member 10 and the first part 4 of the surrounding portion. Accordingly, the electrical resistance is decreased compared to a situation in which the water inside the intestine 8 and the surrounding portion is separated by the intestine 8 and the surrounding air.

The detection device 2 comprises an electric circuitry arranged and configured to measure an electric quantity such as the electrical resistance or the electrical current between the surrounding portion and the tubular member 10. Therefore, the detection unit 2 makes it possible to measure when there is a shift in the current or the resistance between the surrounding portion and the tubular member 10. When a shift occurs, the detection unit has detected that the intestine 8 comprises a leakage hole 12 that passes the surrounding portion.

The length L of the surrounding portion is indicated. Since the intestine 8 is moving with the velocity V the leakage hole 12 will move with the same velocity V relative to the surrounding portion. Thus, the expected contact time contact at which the jet of water 6 will establish an electrical contact between the tubular member 10 and the surrounding portion can be calculated by using the following equation:

$$T_{contact} = L/V \quad (1)$$

In order to avoid a false alarm, the electric circuitry may be configured to detect when the electrical quantity between the surrounding portion and the tubular member 10 is below a predefined level (this is relevant if the electrical resistance is measured) or below a predefined level (this is relevant if the current is measured) for a time period longer than a predefined non-zero time. Hereby, it is possible to avoid a false alarm.

In an example, the velocity V is 2 m/s and L is 10 cm. By using equation (1) one can calculate that:

$$T_{contact} = L/V = (0.10 \text{ m})/(2 \text{ m/s}) = 0.05 \text{ s} = 50 \text{ ms}. \quad (2)$$

With these parameters, one may define that a leakage hole 12 is detected when a reduced electric resistance is below 10 MΩ for a time period in the range 10-50 ms.

Figure 2:
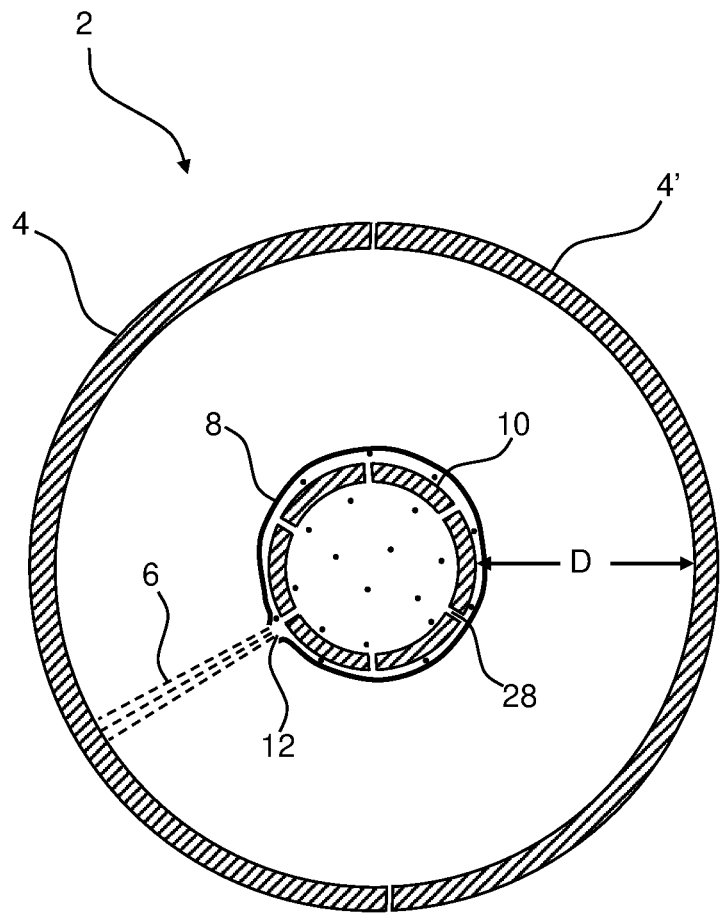
FIG. 2 shows a schematic, cross-sectional side view of the detection unit shown in FIG. 1.

FIG. 2 illustrates a schematic, cross-sectional side view of the detection unit 2 shown in FIG. 1. The first part 4 and the second part 4' of the surrounding portion of the detection unit 2 have a semi-circular cross section. The tubular member 10 has a plurality of perforations 28. The water inside the tubular member 10 is pressurized. Accordingly, the water flows through the perforations 28 and pressurizes the intestine 8.

A jet of water 6 extends between the leakage hole 12 and the surrounding portion. The distance D between the tubular member 10 and the surrounding portion 10 is indicated.

Figure 3:
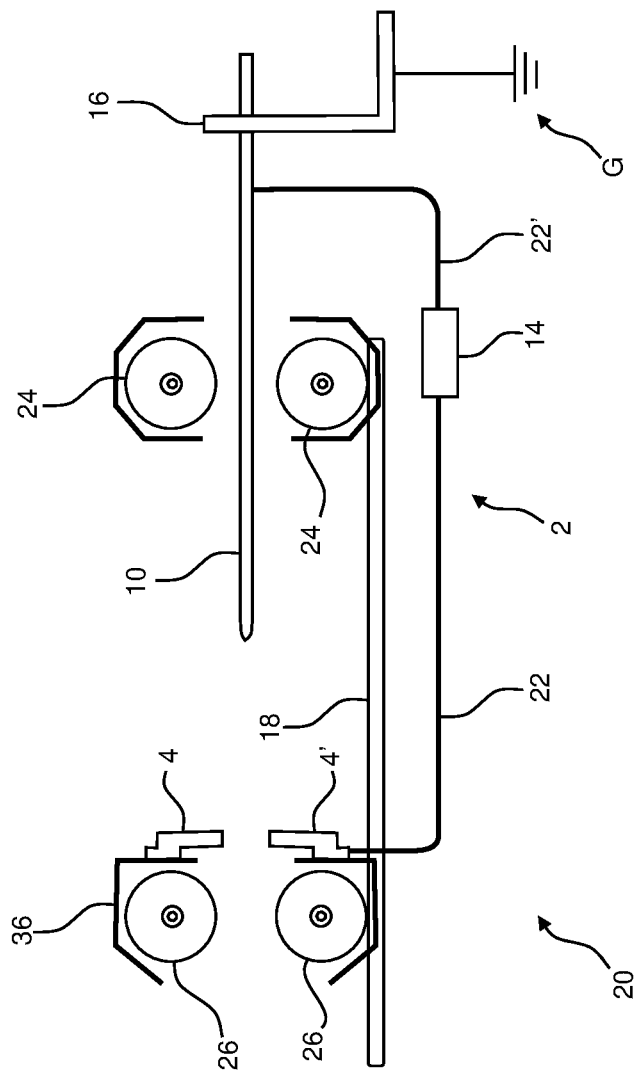
FIG. 3 shows a schematic side view of a processing unit according to an embodiment.
Figure 4:
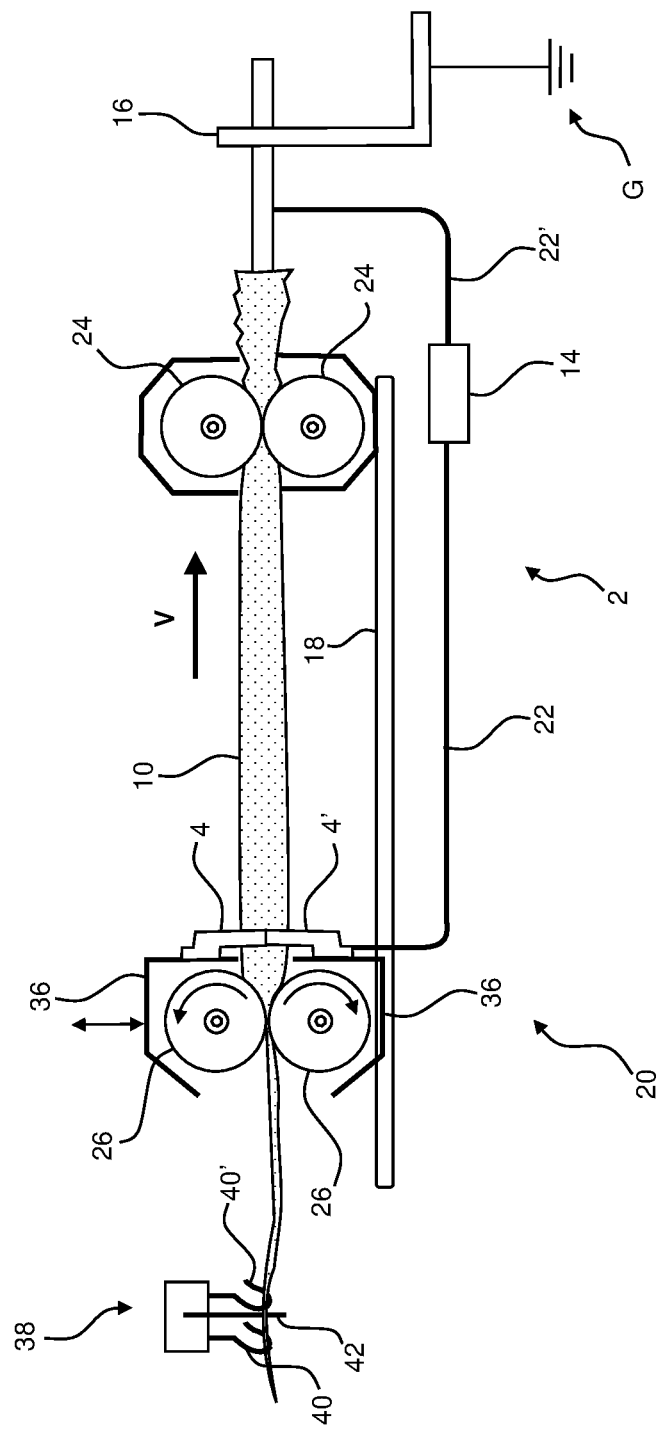
FIG. 4 shows a schematic side view of the processing unit shown in FIG. 3 in another configuration.

FIG. 3 illustrates a processing unit 20 according to an embodiment in a first configuration, wherein FIG. 4 illustrates the processing unit 20 shown in FIG. 3 in a second configuration. The processing unit 20 is designed for processing an intestine 8 having an open end. The processing unit 20 comprises an electrically conducting tubular member 10 having a perforated portion that is configured to distribute a flow of liquid (such as water) through the perforated portion.

The tubular member 10 is arranged and configured to receive the open end of the intestine 8 and hereby allow the intestine 8 to be suspended on the tubular member 10 and hereby pressurize the intestine 8 with the liquid.

The processing unit 20 comprises two drive rollers 24. At least one of the drive rollers 24 comprises a circumferential track configured to engage with the tubular member 10.

At least one of the drive rollers 24 is arranged and configured to move the intestine 8 with a non-zero velocity V along the longitudinal axis of the tubular member 10.

In an embodiment, the drive rollers 24 are shaped in the same way so that both drive rollers 24 comprise a circumferential track configured to engage with the tubular member 10.

The processing unit 20 comprises two clamping rollers 26 arranged to be brought into a clamping configuration, in which the intestine 8 is clamped by the clamping rollers 26.

The distal end of the tubular member 10 is arranged between the drive rollers 24 and the clamping rollers 26. The processing unit 20 comprises a detection unit 2 according to an embodiment. The detection unit 2 is arranged between the drive rollers 24 and the clamping rollers 26.

Each of the clamping rollers 26 is partly covered by a screen 36. The screen 36 may be made of a non-conducting material (e.g. a plastic material). The detection unit 2 is configured to detect a leakage hole in an intestine 8 suspended on the tubular member when the intestine 8 is being moved with a non-zero velocity V along the longitudinal axis of the tubular member 10. The detection unit 2 comprises an electrically conducting and axially extending sleeve-shaped surrounding portion 4, 4' that is configured to be brought into a configuration (as shown in FIG. 4), in which the surrounding portion surrounds the circumference of the tubular member 10.

The detection unit 2 comprises an electric circuitry 14 arranged and configured to measure an electric quantity such as the electric resistance or the electric current which is established between the surrounding portion and the tubular member 10. It can be seen that the electric circuitry 14 is electrically connected to the tubular member 10 and to the surrounding portion by wires 22, 22'. Moreover, the tubular member 10 is fixed to a bracket 16 that is electrically connected to electrical ground G.

The lowermost drive roller 24 and the lowermost clamping roller 26 are slidably mounted on a slide rod 18 for allowing an easy adjustment of the horizontal position of the rollers 24, 26.

In FIG. 3 an intestine 8 is suspended on an intestine detector 38 according to an embodiment. The intestine detector 38 comprises a first end detector 40 and a second end detector 40' arranged a non-zero distance from the first end detector. The intestine detector 38 comprises an intermediate detector 42 arranged and distanced between each of the end detectors 40, 40' in such a configuration that the intermediate detector 42 will be electrically connected to any intestine suspended on the end detectors 40, 40' and extending between the first end detector 40 and the second end detector 40'.

Each of the end detectors 40, 40' is shaped to receive and maintain an intestine suspended on the end detector 40, 40'. The end detectors 40, 40' have the same geometric form. The end detectors 40, 40' comprise a hook-shaped portion. The intermediate detector, however, has a straight distal portion extending between the first end detector 40 and the second end detector 40'.

The end detectors 40, 40' extend through a mounting box that comprises electrical connection structures for connecting an electric circuitry configured to perform one or more electrical measurements by the detectors 40, 40', 42.

The intestine 8 is received by the tubular member 10 and is suspended thereon. Furthermore, the intestine 8 is pressurized and thus inflated by water from the tubular member 10. The intestine 8 is clamped between the clamping rollers 26 in a first position of the intestine 8 and by the drive rollers 24 in another position of the intestine 8.

Figure 5:
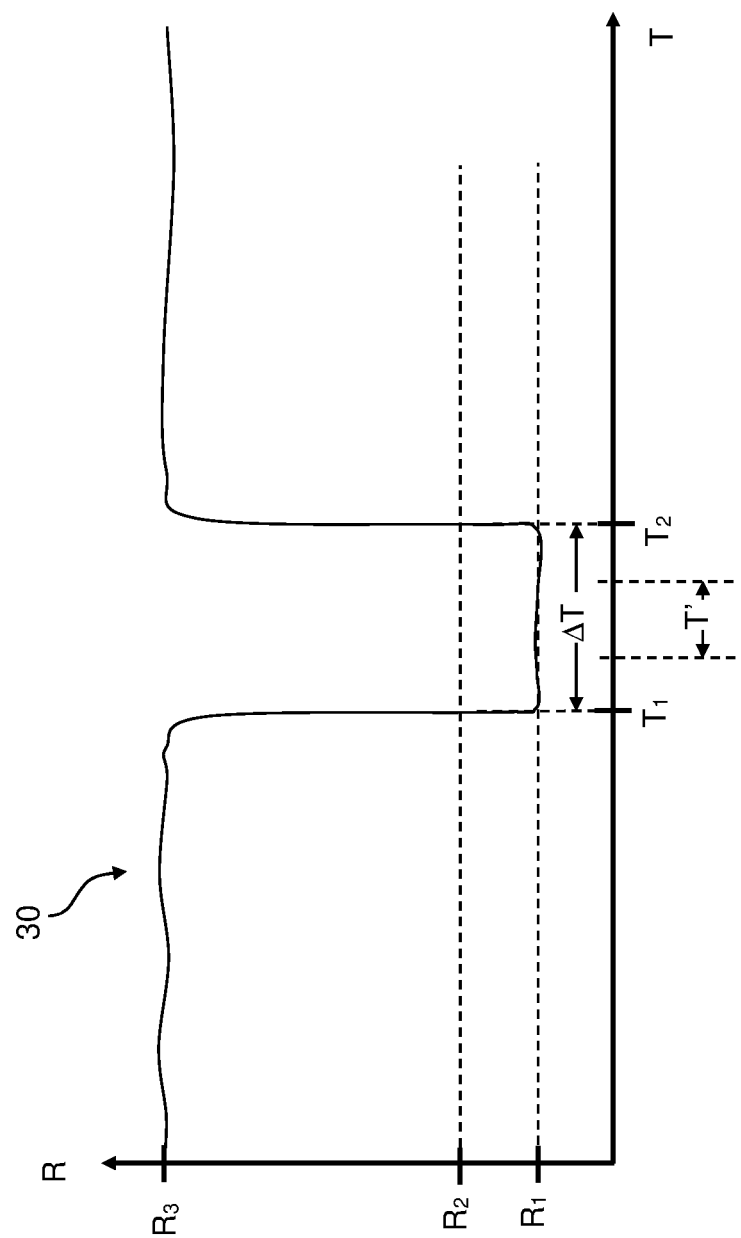
FIG. 5 shows a graph depicting electrical resistance as a function of time.

FIG. 5 illustrates a graph 30 depicting the electrical resistance R as a function of time T. At the time between 0 and $T_1$, the electrical resistance R has a relatively constant level $R_3$. At the time between $T_1$ and $T_2$, the electrical resistance R drops to a lower relatively constant level $R_1$. The duration of this time period $\Delta T$ is indicated. Hereafter the electrical resistance R is increased to the relatively constant level $R_3$.

To avoid a false alarm, the detection unit comprises an electric circuitry that is configured to detect when the electrical resistance R between the surrounding portion and the tubular member is below a predefined level $R_2$ for a time period longer than a predefined non-zero time T'. T' and $R_2$ are indicated in the graph. Since the time period $\Delta T$ is larger than the predefined non-zero time T', the measurement is not considered a false alarm. In an embodiment, $R_2$ is 10 M$\Omega$.

Figure 6:
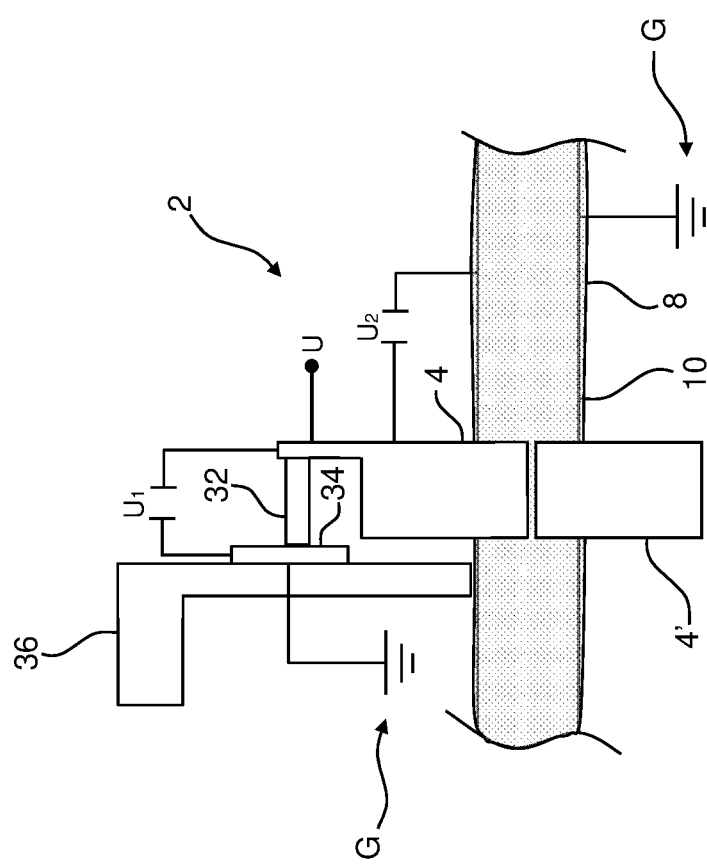
FIG. 6 shows a schematic view of a detection device according to an embodiment.

FIG. 6 illustrates a schematic view of detection device 2 according to an embodiment. The detection unit 2 comprises a surrounding portion that comprises a first part 4 and a second part 4'. The first part 4 and the second part 4' each comprise a semi-cylindrical portion. The surrounding portion surrounds a tubular member 10 that extends centrally along the longitudinal axis of the surrounding portion. The tubular member 10 is grounded. An intestine 8 is suspended on the tubular member 10.

The first part 4 is connected to an insulating structure 32 that is sandwiched between a protruding portion of the first part 4 and a conductive structure 34. The conductive structure 34 is grounded and attached to a non-conduction screen 36.

A predefined electrical potential U is provided at the surrounding portion. If a water film establishes an electrical connection between the first part 4 and the conductive structure 34 the potential difference $U_1$ between the first part 4 and the conductive structure 34 will be zero. If, however, there is no water on the insulating structure 32, there will be a non-zero potential difference $U_1$.

By measuring the potential difference between the first part 4 and the conductive structure 34 it is possible to detect if the surrounding portion is electrically insulated from the conductive structure 34. The conductive structure 34 may be a metal plate.

If the surrounding portion is electrically insulated from the conductive structure 34 measurement of the potential difference (or electrical current or electrical resistance) between the first part 4 and the tubular member 10 can be used to detect if there is a leakage hole in the water pressurized intestine 8 suspended on the tubular member 10.

Figure 7:
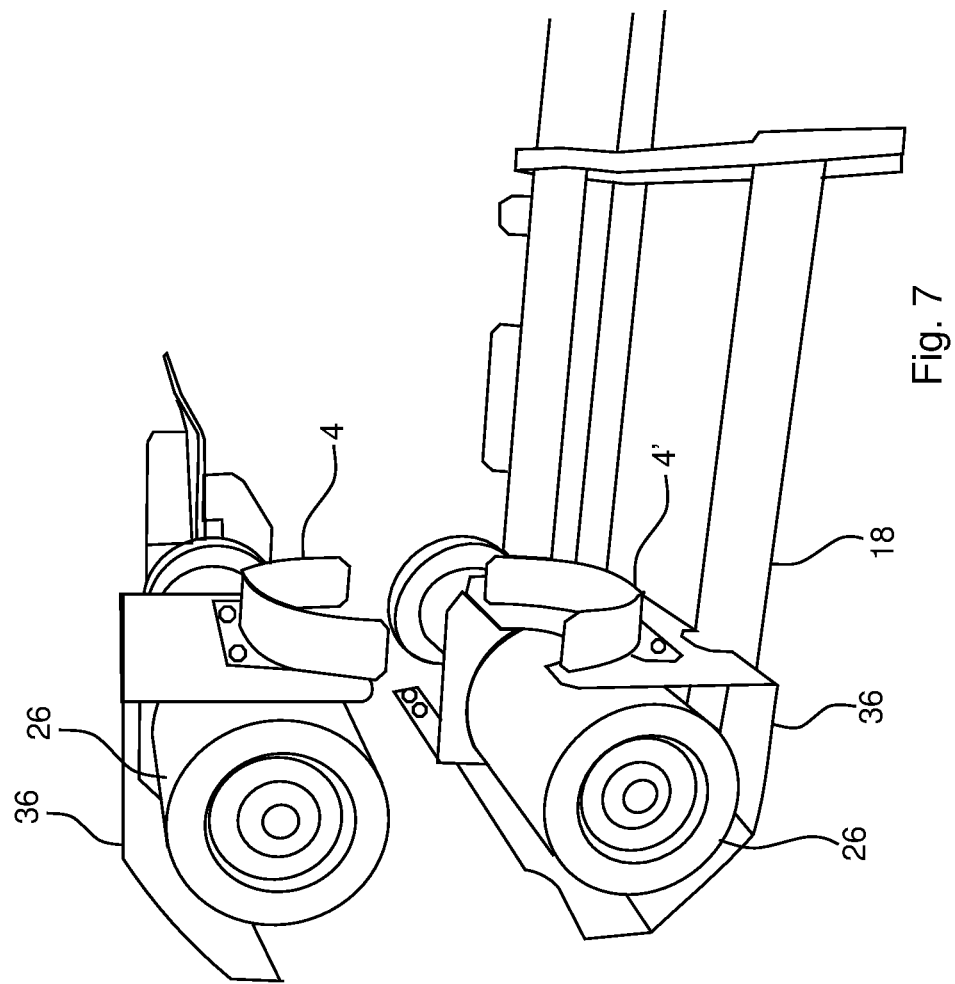
FIG. 7 shows a perspective view of a detection unit according to an embodiment.

FIG. 7 illustrates a perspective view of a detection unit according to an embodiment. The detection unit 2 comprises a surrounding portion comprising a first part 4 and a second part 4' that are made of metal (e.g. stainless steel). The parts 4, 4' are movable relative to each other. The first part 4 comprises a semi-cylindrical part that is attached to a screen 36 made of a non-conducting material such as plastic. The first part 4 comprises a mounting plate that is attached to the screen 36 by screws.

Each of the two screens 36 surrounds a portion of a rotatably mounted clamping roller 26. The clamping rollers are arranged and configured to be brought into a configuration, in which they press against an intestine and hereby clamp the intestine such that the intestine can be pressurized with a liquid (e.g. water).

The lower screen 36 is slidably mounted on a slide rod 18 extending horizontally. In the configuration shown in FIG. 7 an intestine can enter through the surrounding portion since the first part 4 is spaced vertically from the second part 4'. The first part 4, however, is mounted such that it can be vertically displaced and hereby be brought into contact with the second part 4' so that the first part 4 and the second part 4' are electrically connected and the surrounding portion is arranged in a configuration, in which it surrounds the intestine (not shown).

Figure 8:
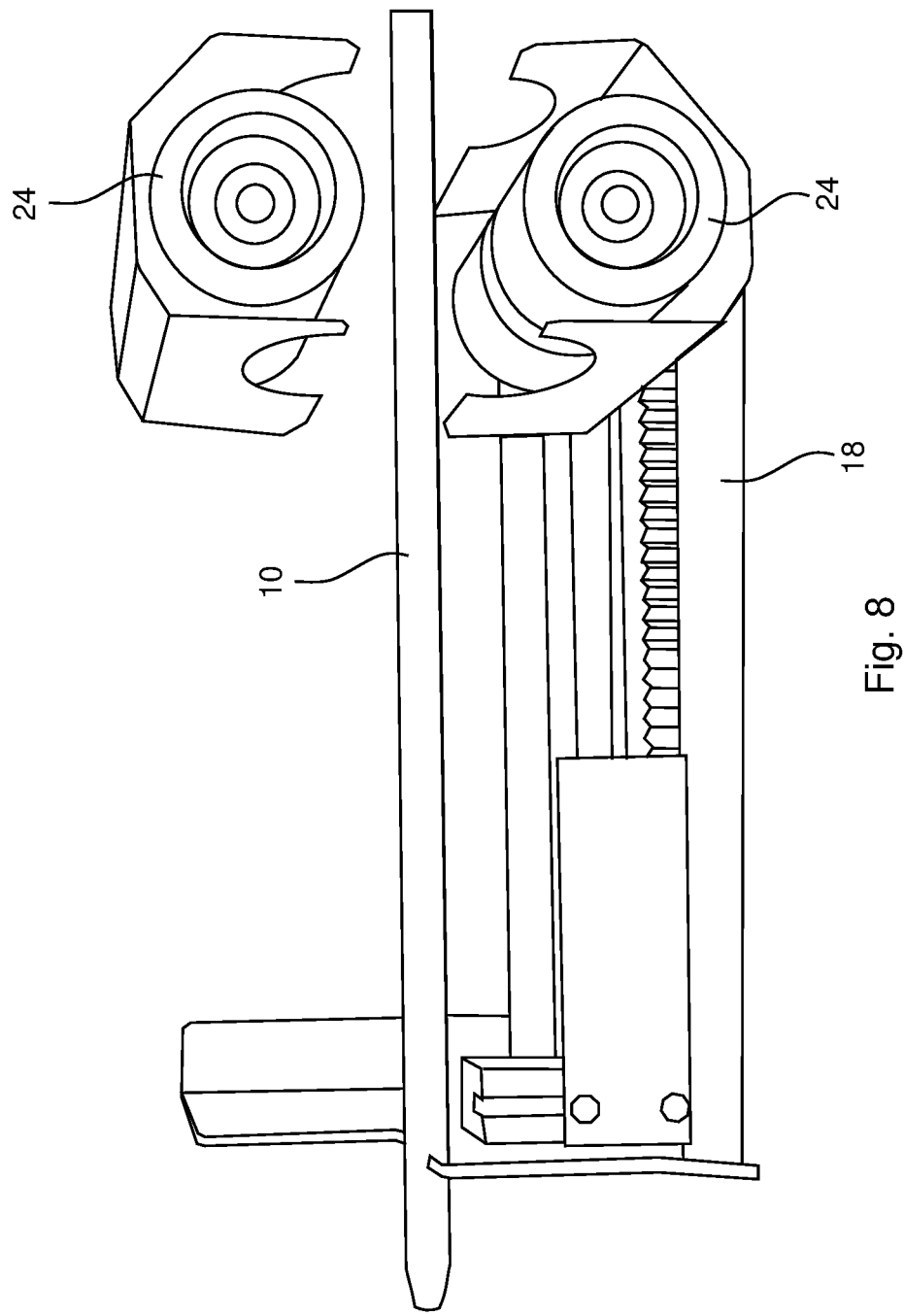
FIG. 8 shows a side view of a tubular member having a distal end that is arranged between a set of drive rollers and a set of clamping rollers (such as the one shown in FIG. 7)

FIG. 8 illustrates a side view of a tubular member 10 having a distal end that is arranged between a set of drive rollers 24 and a set of clamping rollers (such as the one shown in FIG. 7). Each of the drive rollers 24 is partly surrounded by a screen. The screen of the lower drive roller 24 is slidably arranged on a slide rod 18.

Each drive roller 24 comprises a circumferential track configured to engage with the tubular member 10. The track is shaped to receive half of the tubular member 10 so that the non-tracked portion of the drive rollers 24 will bear against each other when the tracks are brought into contact with the tubular member 10. The track is provided with furrows for enhancing the grip.

Figure 9:
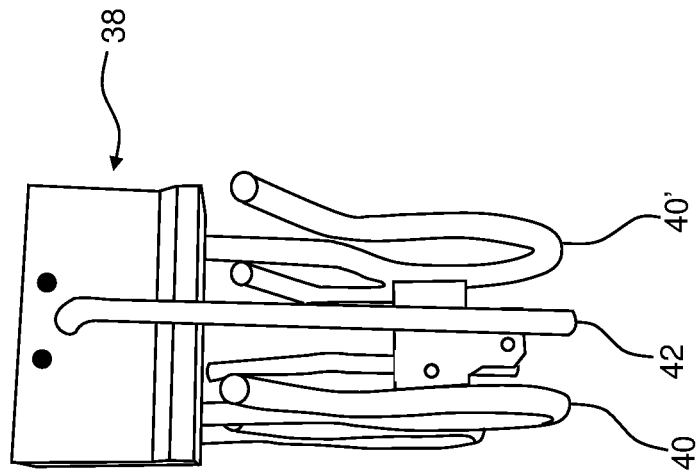
FIG. 9 shows an intestine detector according to an embodiment.

FIG. 9 illustrates an intestine detector 38 according to an embodiment. The intestine detector 38 comprises a first end detector 40 and a second end detector 40' arranged a non-zero distance from the first end detector. The intestine detector 38 comprises an intermediate detector 42 arranged and distanced between each of the end detectors 40, 40' in such a configuration that the intermediate detector 42 will be electrically connected to any intestine suspended on the end detectors 40, 40' and extending between the first end detector 40 and the second end detector 40'.

Each of the end detectors 40, 40' is shaped to receive and maintain an intestine suspended on the end detector 40, 40'. The end detectors 40, 40' have the same geometric form. The end detectors 40, 40' comprise a hook-shaped portion. The intermediate detector, however, has a straight distal portion extending between the first end detector 40 and the second end detector 40'.

The end detectors 40, 40' extend through a mounting box that comprises electrical connection structures for connecting an electric circuitry configured to perform one or more electrical measurements by the detectors 40, 40', 42.

Figure 10:
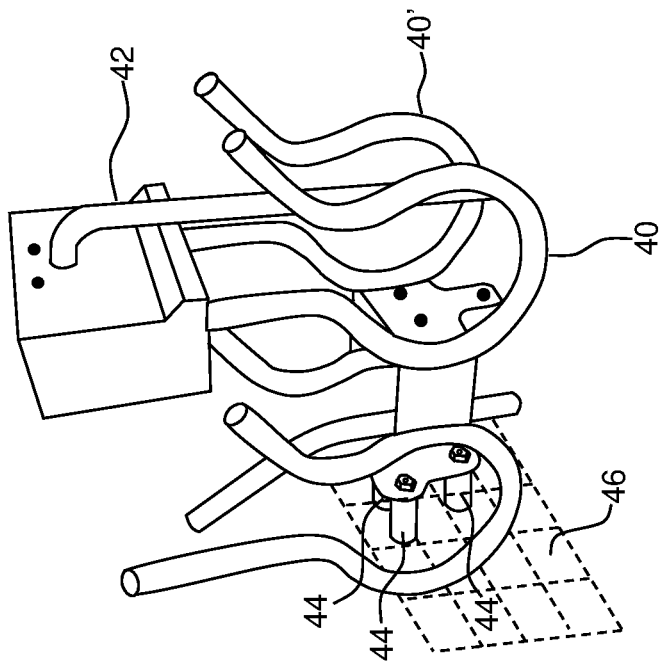
FIG. 10 shows a perspective side view of the intestine detector shown in FIG. 9.

FIG. 10 illustrates a perspective side view of the intestine detector 38 shown in FIG. 9. It can be seen that the intestine detector 38 comprises two equally shaped receiving portions each comprising a set of detectors 40, 40' and an intermediate detector 42 arranged therebetween. Moreover, it can be seen that the intestine detector 38 is electrically insulated by insulators 44 from the wall 46 onto which the intestine detector 38 is attached.

FIG. 11 illustrates an intestine detector 38 according to an embodiment. The intestine detector 38 basically corresponds to the one shown in FIG. 9. The intestine detector 38, however, comprises no second end detector 40'. The intestine detector 38 comprises an intermediate detector 42 arranged and distanced from and extending parallel to the first end detectors 40 in such a configuration that the intermediate detector 42 will be electrically connected to any intestine suspended on the first end detector 40.

The first end detector 40 is shaped to receive and maintain an intestine suspended on the first end detector 40. The first end detector 40 comprises a hook-shaped portion.

The first end detector 40 extends through a mounting box that comprises electrical connection structures for connecting an electric circuitry configured to perform one or more electrical measurements by the detectors 40, 42.

FIG. 12 illustrates a perspective side view of the intestine detector 38 shown in FIG. 11. It can be seen that the intestine detector 38 comprises a receiving portion comprising a first end detector 40 and an intermediate detector 42 arranged adjacent to the first end detector 40. Moreover, it can be seen that the intestine detector 38 is electrically insulated by insulators 44 from the wall 46 onto which the intestine detector 38 is attached.

LIST OF REFERENCE NUMERALS

2 Detection unit
4, 4' Part
6 Liquid
8 Intestine
10 Tubular member
12 Leakage hole
14 Electric circuitry
16 Bracket
18 Rod
20 Processing unit
22, 22' Wire
24 Roller
26 Roller
28 Perforation
30 Graph
32 Insulating structure
34 Conductive structure
36 Non-conduction screen
38 Intestine detector
40, 40' End detector
42 Intermediate detector
44 Insulator
46 Wall
R, $R_1$ Resistance
$R_2$, $R_3$ Resistance
T, T', ΔT Time
T1, T2 Time
D Distance
V Velocity
L Length
G Electrical grounding
U, $U_1$, $U_2$ Voltage

What is claimed is:

1. A detection unit configured to detect a leakage hole in an intestine suspended on a tubular member having a perforated portion that is configured to distribute a flow of liquid through the perforated portion and thereby pressurize the intestine when the intestine is being moved with a non-zero velocity (V) along a longitudinal axis of the tubular member, the detection unit comprising:
   an electrically conducting and axially extending sleeve-shaped surrounding portion that at least partly surrounds a circumference of the tubular member; and
   electric circuitry arranged and configured to measure an electric quantity established between the surrounding portion and the liquid pressurizing the intestine.

2. The detection unit according to claim 1, wherein a distance (D) between the surrounding portion and the tubular member is selected independently of a type of intestine.

3. The detection unit according to claim 2, wherein the distance (D) between the surrounding portion and the tubular member is within a range of 20-50 mm when the intestine is from a pig.

4. The detection unit according to claim 2, wherein the distance (D) between the surrounding portion and the tubular member is within a range of 10-40 mm when the intestine is from a sheep.

5. The detection unit according to claim 2, wherein the distance (D) between the surrounding portion and the tubular member is within a range of 25-70 mm when the intestine is from a cattle.

6. The detection unit according to claim 1, wherein the surrounding portion comprises a first part and a second part, wherein the first part and the second part are movably arranged relative to each other.

7. The detection unit according to claim 1, wherein the electric circuitry is electrically connected to a first contact point being electrically connected to the liquid and to the surrounding portion at a second contact point that is electrically isolated from the liquid.

8. The detection unit according to claim 1, wherein the surrounding portion extends along at least 355 degrees of the circumference of the tubular member.

9. The detection unit according to claim 1, wherein the electric circuitry is configured to detect when the electrical quantity between the surrounding portion and the tubular member is not within a predefined level for a time period longer than a predefined non-zero time interval (T').

10. The detection unit according to claim 9, wherein the electrical quantity is electrical resistance (R) and a predefined level of resistance ($R_1$) is 10 MΩ or less.

11. The detection unit according to claim 9, wherein the predefined time interval (T') is selected in dependency of a length (L) of the surrounding portion and the velocity (V) such that $$\frac{L}{V} \geq T' \geq \frac{L}{10V}.$$

12. A processing unit for processing an intestine having an open end, the processing unit comprising:
   a tubular member having a perforated portion that is configured to distribute a flow of liquid through the perforated portion, wherein the tubular member is configured to receive the open end of the intestine and suspend the intestine on the tubular member and thereby pressurize the intestine;
   two drive rollers, wherein at least one of said drive rollers comprises a circumferential track configured to engage with the tubular member, wherein at least one of the drive rollers is arranged and configured to move the intestine with a non-zero velocity (V) along a longitudinal axis of the tubular member;
   two clamping rollers arranged to be brought into a clamping configuration, in which the intestine is clamped by the clamping rollers, wherein a distal end of the tubular member is arranged between the drive rollers and the clamping rollers; and
   a detection unit according to claim 1.

13. The processing unit according to claim 12, wherein the detection unit is arranged between the drive rollers and the clamping rollers.

14. A method for detecting a leakage hole in an intestine suspended on a tubular member having a perforated portion that is configured to distribute a flow of liquid through the perforated portion and thereby pressurize the intestine, when the intestine is being moved with a non-zero velocity (V) along a longitudinal axis of the tubular member, the method comprising:
   arranging an electrically conducting and axially extending sleeve-shaped surrounding portion such that the surrounding portion at least partly surrounds a circumference of the tubular member; and
   measuring an electrical quantity between the surrounding portion and the liquid pressurizing the intestine.

15. The method according to claim 14, further comprising arranging the tubular member such that a distance (D) between the surrounding portion and the tubular member is selected in dependency of a type of intestine, wherein the distance (D) is:
  a) within a range of 20-50 mm when the intestine is from a pig;
  b) within a range of 10-40 mm when the intestine is from a sheep; and
  c) within a range of 25-70 mm when the intestine is from a cattle.

16. The method according to claim 14, wherein the surrounding portion comprises a first part and a second part, wherein the first part and the second part are movably arranged relative to each other.

17. The method according to claim 14, wherein the surrounding portion extends along at least 355 degrees of the circumference of the tubular member.

18. The method according to claim 14, wherein an electric circuitry is configured to detect when the electrical quantity between the surrounding portion and the liquid is below a predefined resistance level ($R_1$) for a time period ($\Delta T$) longer than a predefined non-zero time interval (T').

19. The method according to claim 18, wherein the predefined resistance level ($R_1$) is 10 MΩ or less.

20. The method according to claim 18, wherein the predefined time interval T' is selected in dependency of a length (L) of the surrounding portion and the velocity (V) such that $$\frac{L}{V} \geq T' \geq \frac{L}{10V}.$$

* * * * *